Nov. 30, 1954  M. F. EHLINGER  2,695,682
TRUCK BRAKING JACK
Filed April 18, 1952
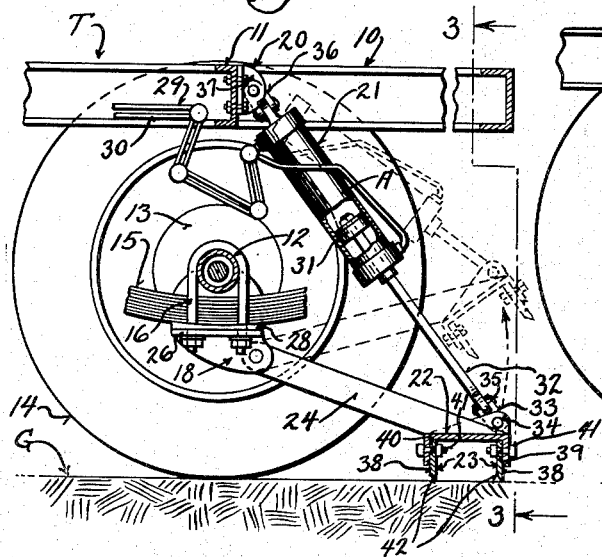
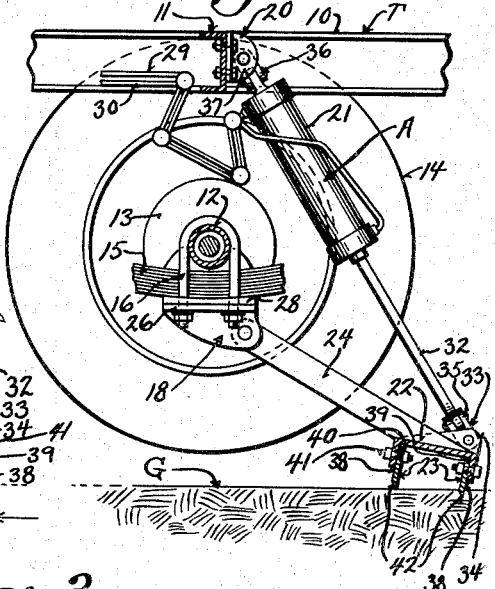
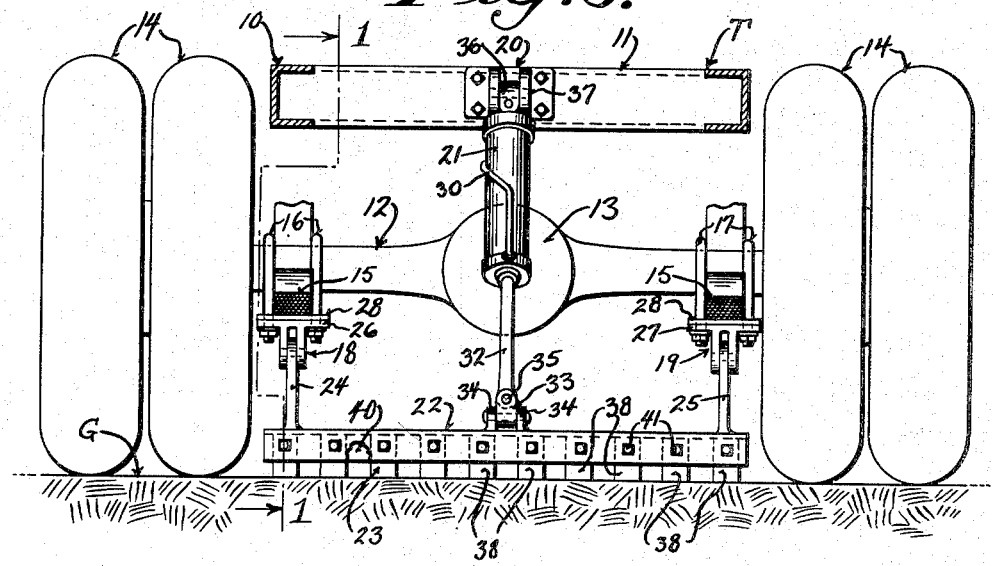
INVENTOR
MICHAEL F. EHLINGER
BY
*Monny Wright*
ATTORNEYS

United States Patent Office 2,695,682
Patented Nov. 30, 1954

2,695,682

TRUCK BRAKING JACK

Michael F. Ehlinger, Suring, Wis.

Application April 18, 1952, Serial No. 283,153

1 Claim. (Cl. 188—5)

This invention appertains to anti-skid devices and more particularly to power operated anti-skid mechanisms for motor vehicles.

A primary object of my invention is to provide a power operated anti-skid mechanism adapted to resist forward, rearward or side slippage of the rear wheels of trailer trucks or other motor vehicles when the vehicle is moving over snow, ice and other slippery surfaces.

My anti-skid device is designed primarily to be utilized with heavy semi-trailers and to overcome the dangers of the trailer jackknifing when moving down grade or slipping rearwardly when moving up a hill, particularly when same is under heavy load.

Another object of my invention is to provide an anti-skid device which may be attached to the axle and frame of the vehicle to be raised or lowered by means of a hydraulic piston and which includes a series of surface gripping teeth.

A further object of my invention is to provide my anti-skid mechanism or brake with means adapted to elevate the wheels of the vehicle above the surface of the road or pavement when desired.

One of the salient features of my invention resides in so constructing and disposing the ground engaging teeth of the anti-skid mechanism relative to the wheels of the vehicle so that they retard and prevent rearward, forward or sidewise slippage of the vehicle when the same is traveling on slippery surfaces such as encountered in icy or snowy weather.

Another important object of the invention is to provide a simple, practical and reliable construction that is economical to manufacture, easy to assemble and positive in its operation.

With the above and other objects in view, which will be more readily apparent as the nature of the invention is better understood, the same consists in the novel construction, combination and arrangement of parts hereinafter more fully described, illustrated and claimed.

One preferred and practical embodiment of the invention is shown in the accompanying drawing in which:

Figure 1 is a fragmentary side elevational view, in section, of a motor trailer truck with my novel anti-skid mechanism applied thereto showing in particular, the series of teeth in the ground engaging position, the section being taken on the line 1—1 of Figure 3 and looking in the direction of the arrows;

Figure 2 is a fragmentary side elevational view, similar to Figure 1 of the drawings but showing the position of my novel anti-skid mechanism when the same is utilized as a jack; and Figure 3 is a rear elevational view, in section, of the vehicle illustrated in Figure 1 of the drawings, the section being represented by the line 3—3 of Figure 1 and looking in the direction of the arrows.

Referring now to the drawing in detail, wherein similar reference characters designate corresponding parts throughout the several views, the letter A generally indicates one type of my improved anti-skid mechanism and the same is shown applied to the chassis of the tractor T of a semi-trailer.

While it is obvious that my device A may be applied to any type of motor vehicle, it is particularly designed to be attached to trailer trucks carrying heavy loads which aggravate greatly the dangers normally encountered when traveling over slippery surfaces.

As indicated, the trailer truck T may be of a conventional construction and includes a chassis or frame 10 carrying the usual brace or cross bar 11, axle 12, differential 13, and dual wheels 14. The load strain upon the axle wheels is partly cushioned by the leaf springs 15 secured to the axle 12 by means of the pairs of U bolts 16 and 17 respectively.

It is important to note that the anti-skid device A is pivotedly mounted to the vehicle at three points, 18, 19 and 20 and the same includes broadly, a hydraulically operated cylinder 21, a ground engaging U frame 22 carrying the rows of teeth 23 and the side frame booms 24 and 25. The booms 24 and 25 are rigidly secured to the top surface of the U-shaped frame 22 and are pivotedly secured at their upper ends to the brackets 26 and 27 which are in turn held to the standard U bolt plates 28 by utilizing the pairs of U bolts 16 and 17 respectfully. The hydraulic cylinder 21, is of the type that may be locked in any given position and the hydraulic fluid enters the top and the bottom of the cylinder through the hydraulic feed lines 29 and 30, respectively. Slideably mounted in the hydraulic cylinder, is the piston 31 and rigidly secured to the piston 31 is the piston rod 32. The rod 32 is pivotedly mounted to the U frame 22 by means of a universal knuckle joint 33. The knuckle joint 33 is pivoted between the upstanding ears 34 of the U frame 22 to provide for the longitudinal pivoting motion of the rod 32 while the rod itself is pivotedly mounted to the other end 35 of the knckle joint 33 to provide for the transverse pivoting motion. The head of the cylinder 21 is pivotedly mounted by means of a similar universal knuckle joint 36 to a frame bracket 37 which is, in turn, securely bolted in place to the cross member 11 as shown.

It is to be noted that each individual tooth 38 is individually and removably secured to the inner sides 39 and 40 respectively of the U frame 22 by means of the nuts and bolts 41. This facilitates the replacement of broken and damaged teeth. Each tooth 38 is beveled at its lower end as shown, to provide a sharp blade edge 42 for engaging the road or ground surface G.

In utilizing my anti-skid mechanism, the device is normally carried out of the way in the dotted line position as shown in Figure 1 of the drawings and it is to be noted that in this fully retracted position, the rows of teeth 23 do not protrude below the differential 13 or spring 15 of the vehicle so that any obstructions in the road surface which may be cleared by these members will also be easily cleared by my anti-skid device. If, for any reason the vehicle should start to slide or slip in any direction, the anti-skid mechanism may be easily and quickly lowered to engage the ground surface G as shown in full lines in Figure 1 and as stated above, the piston 31 may be locked in any position in the cylinder 21. This may be accomplished by any standard type of actuating valve (not shown) located in the cab for that purpose. If, for any reason the vehicle cannot be moved forward or rearwardly and it is desired to firmly and securely lock the vehicle against any movement, my device may be further actuated to the position illustrated in Figure 2 and the wheels will be raised above the ground surface G and the rows of teeth 23 will firmly hold the vehicle against any movement whatever. It is obvious that when the vehicle is in the position as shown in Figure 2, my device may accomplish the same purposes as a jack and removal of the dual wheels 14 may be easily accomplished for tire and other repairs.

A salient feature of my anti-skid device is that the same may be quickly raised from its ground engaging position in the direction of the arrow, Figure 1, to its dotted line position or any desired intermediate position. The arrangement of the side booms 24 and 25 with respect to the frame 22 and brackets 18 and 19 is such that a firm and steady pivoting of the frame 22 is had and so that the beveled edges 42 of the row of teeth 23 will engage the horizontal ground surface simultaneously and lie in the same horizontal plane in the ground engaging position. However, due to the novel universal arrangement of the knuckle joints 33 and 36, the cylinder 21 and piston rod 32 will not only pivot horizontally but may move transversely and laterally as well with respect to the U frame 22 and cross member 11. This is an extremely important feature in that it allows the U frame 22 to always move in the same arc or plane regardless of the position of the frame 10 and cross bar 11. For example, it often happens that the frame 10 may be slightly tilted as a result of uneven load distributions, but it is necessary, in order to obtain maximum effect from the ground engaging teeth, to be sure that both ends of the rows of teeth 23 engage simultaneously, and this is accomplished by the arrangement above described.

From the foregoing it is believed that the features and advantages of the invention will be readily apparent to those skilled in the art, and it will, of course, be understood that changes in the form, proportion and minor details of construction may be resorted to without departing from the spirit of the invention or the scope of the appended claim.

I claim:

A combined anti-skid and jacking device for a power driven road vehicle adapted to be secured to a rear cross frame member and the rear axle adjacent the rear wheels, comprising in combination an elongated inverted U frame extending transversely under the vehicle and carrying depending parallel rows of ground engaging teeth, each tooth being independently and removably secured to the frame, side frame booms, each boom rigidly secured to the U frame at one end thereof and having its upper end adapted to be pivotally secured to the said rear axle, a fluid pressure cylinder intermediate the side booms, said cylinder being adapted to be connected to the said rear cross frame member at its upper end by means of a universal joint, a piston movable in said cylinder, a piston rod operatively connected at one end to the piston and having its other end connected to the top surface of said U frame by means of a universal joint, whereby uneven load distributions and tilting of the vehicle frame will not be transmitted to the U frame, and hydraulic means for moving said piston back and forth in the cylinder and for locking the piston in any position, said U frame member and side frame booms being so constructed and arranged that when the rows of teeth are moved to the ground engaging position, they will engage the horizontal ground surface simultaneously and lie in the same horizontal plane in the ground engaging position.

References Cited in the file of this patent

UNITED STATES PATENTS

| Number | Name | Date |
| --- | --- | --- |
| 876,475 | Morgan | Jan. 14, 1908 |
| 1,625,226 | Simmons | Apr. 19, 1927 |
| 1,753,588 | Baillie | Apr. 8, 1930 |
| 2,459,016 | Cohen | Jan. 11, 1949 |
| 2,636,577 | Niedenthal | Apr. 28, 1953 |
| 2,650,679 | Durkin | Sept. 1, 1953 |

FOREIGN PATENTS

| Number | Country | Date |
| --- | --- | --- |
| 11,062 | Great Britain | May 11, 1906 |
| 316,963 | Great Britain | Aug. 7, 1929 |